United States Patent [19]
Webb

[11] Patent Number: 5,098,046
[45] Date of Patent: Mar. 24, 1992

[54] ELECTRICAL JUNCTION BOX MOUNTING BRACKET DEVICE AND METHOD

[76] Inventor: Ronald D. Webb, 1176 E. Corson St., Pasadena, Calif. 91101

[21] Appl. No.: 479,388

[22] Filed: Feb. 12, 1990

Related U.S. Application Data

[63] Continuation-in-part of Ser. No. 118,444, Nov. 9, 1987, abandoned.

[51] Int. Cl.$^5$ .............................................. G12B 9/00
[52] U.S. Cl. .................................. 248/27.1; 174/48; 220/3.9; 248/300; 248/311.2; 248/906
[58] Field of Search ............... 248/300, 27.1, 906, 248/311.2, 205.1, 544; 220/3.9, 3.92, 3.6; 174/88

[56] References Cited

U.S. PATENT DOCUMENTS

| | | | |
|---|---|---|---|
| 1,774,934 | 9/1930 | Mangin | 220/3.92 |
| 2,314,408 | 3/1943 | Knight . | |
| 3,528,636 | 9/1970 | Schmidt . | |
| 4,399,922 | 8/1983 | Horsley | 220/3.6 |
| 4,533,060 | 8/1985 | Medlin | 220/3.9 |
| 4,569,458 | 2/1986 | Horsley | 220/3.6 |
| 4,572,391 | 2/1986 | Medlin | 220/3.9 |
| 4,603,789 | 8/1986 | Medlin, Sr. | 220/3.9 |
| 4,645,089 | 2/1987 | Horsley | 220/3.6 |
| 4,688,693 | 8/1987 | Medlin, Jr. | 220/3.9 |
| 4,832,297 | 5/1989 | Carpenter | 248/906 X |

OTHER PUBLICATIONS

"Footed Box Support" All-Steel Equipment Inc., Aurora, Illinois, 1969.

*Primary Examiner*—David L. Talbott
*Attorney, Agent, or Firm*—Sheldon & Mak

[57] ABSTRACT

A bracket device for mounting electrical devices in the interior of hollow partitions having a front wall and a back wall with a hollow space therebetween typically comprising: (i) a base capable of being fixedly attached to the floor; (ii) a riser extending upwardly from the base; and (iii) an annular plate having front and rear faces attached to the upper portion of the riser and having an opening therethrough sufficiently large to receive an electrical device accessible from the exterior side of the front wall, the annular plate also having means such as mounting holes for attaching a cover ring to its front face and a junction box to its rear face. Preferably, the device also includes (iv) a stabilizing arm extending rearwardly from the annular plate, the arm being sufficiently long to extend to the rear wall of the partition. The stabilizing arm can be attached either to an upper segment or a lower segment of the annular plate. A back plate extending vertically can be attached to the stabilizing arm for additional stability. The riser and the stabilizing arm can be adjustable in length. In alternative embodiments, either the cover ring or the junction box can be an integral part of the bracket device.

33 Claims, 3 Drawing Sheets

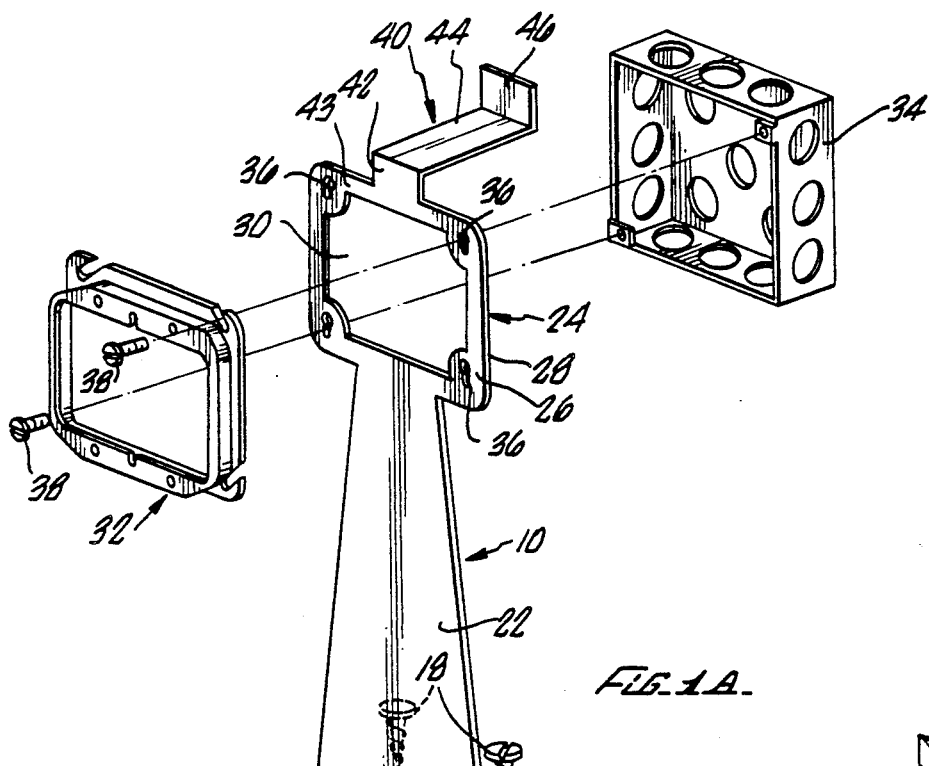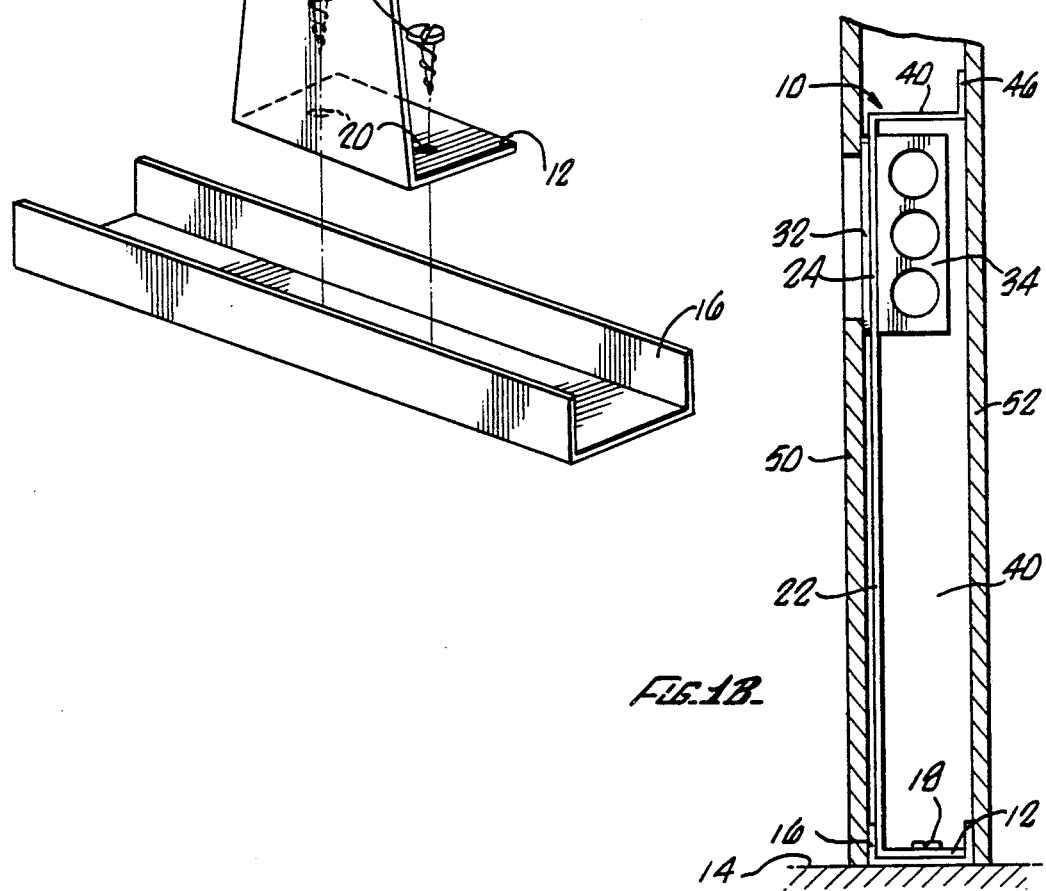

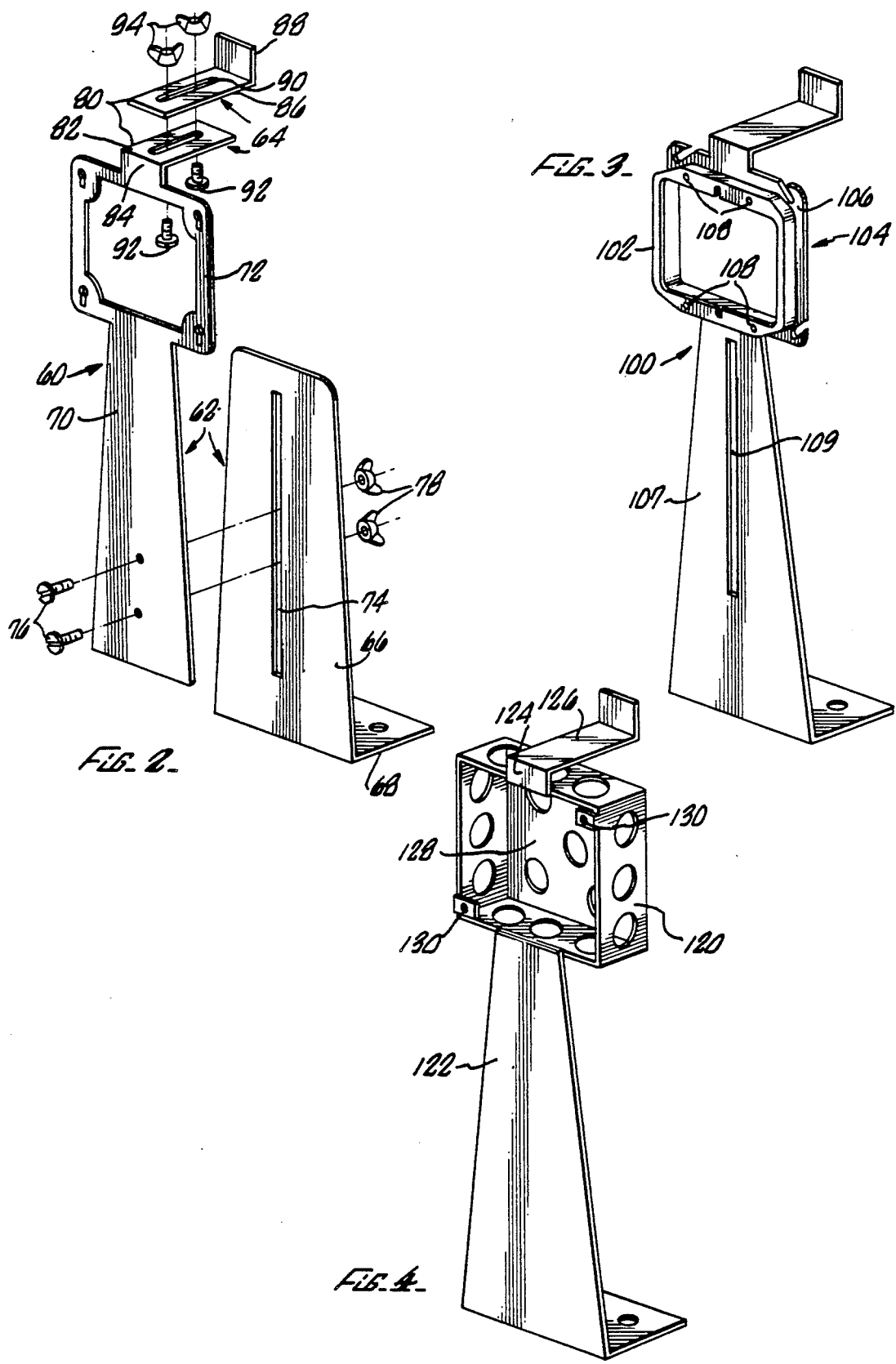

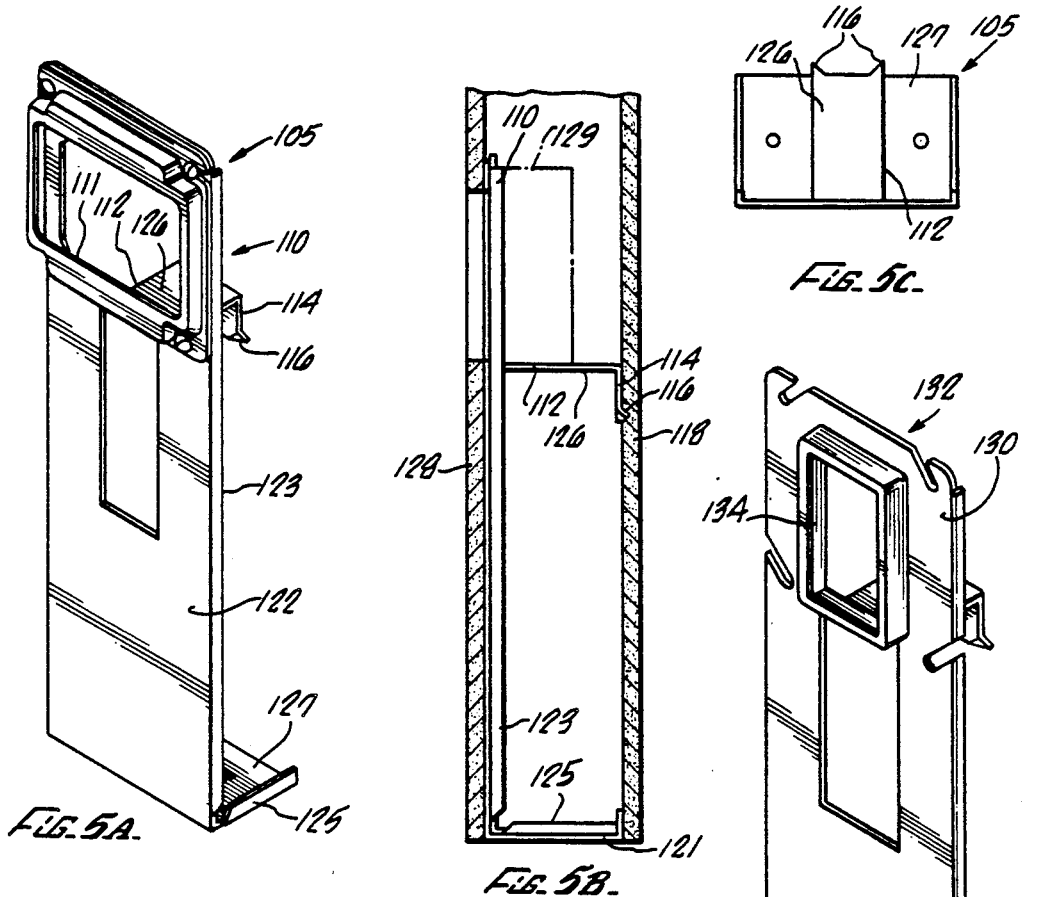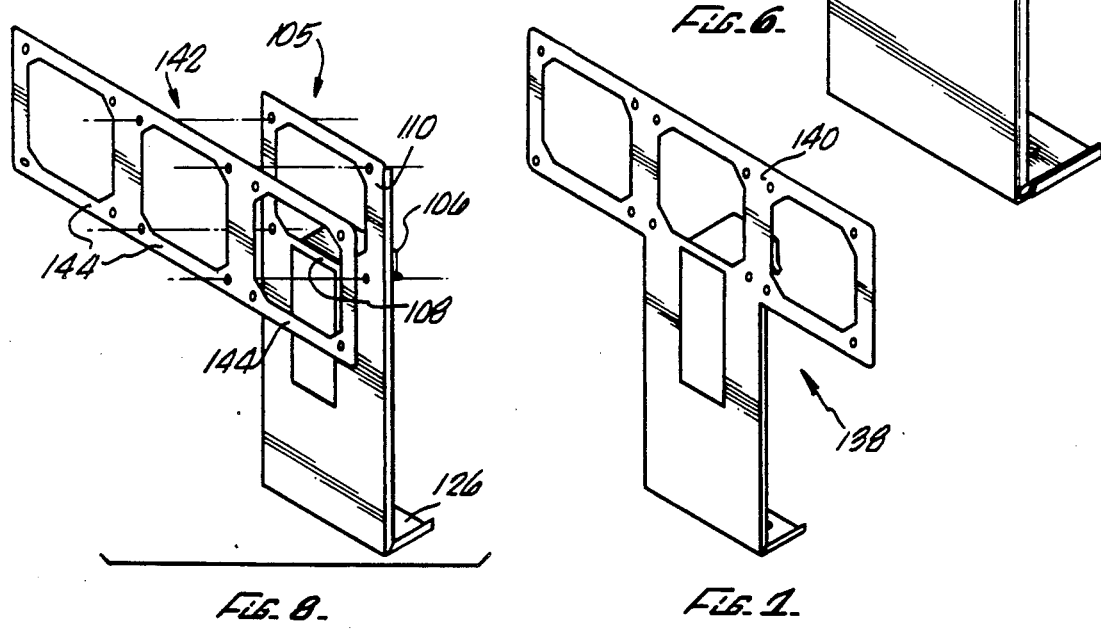

ELECTRICAL JUNCTION BOX MOUNTING BRACKET DEVICE AND METHOD

CROSS-REFERENCE TO RELATED APPLICATION

This is a continuation-in-part of patent application Ser. No. 118,444, filed Nov. 9, 1987, now abandoned.

BACKGROUND

The present invention is directed to a bracket for mounting electrical devices in partitions.

During building construction, electrical outlets and switches, as well as other electrical devices positioned in a wall and reachable by occupants of the building, must be installed. These electrical devices are normally wired into metal junction boxes which themselves are mounted within the walls or other hollow partitions. This mounting has often been the source of trouble and delay during construction.

The traditional method for mounting junction boxes has been to mount them onto studs in the wall or partition. This has several disadvantages. For example, the junction boxes must be installed after the studs are in place, but before the wallboard or other surface panel is installed, allowing only a short time for mounting. If the mounting is not accomplished within this short time interval, the junction boxes must then be mounted later after completion of the wall. This requires cutting holes in the wall, which is expensive, time-consuming, and unsightly. Also, the junction boxes can only be mounted where the studs are located, which limits the flexibility of their placement and greatly complicates planning for specialized electrical installations. Further, it is difficult or impossible to adjust the location of the junction boxes relative to the position of the studs if they are installed onto studs.

Junction boxes mounted by conventional brackets are typically susceptible to damage during earthquake or fire, thereby causing or contributing to a fire due to damaged electrical apparatus inside the box. The junction box is damaged when the wall stud to which the bracket is attached, or the wall partition in which the box is embedded, buckles during an earthquake or fire.

Accordingly, there is a need for a system for installing junction boxes for electrical devices that allows flexibility in the timing of the installation, flexibility in the placement of the junction boxes, ease in adjusting the height of the boxes as installed, and reduced susceptibility to damage during an earthquake or fire.

SUMMARY

The present invention provides a bracket device that satisfies this need. A bracket device according to the present invention is suitable for mounting electrical devices in the interior of hollow partitions having a front wall and a rear wall, with a hollow space therebetween. The use of this bracket device has considerable advantages over the traditional method of mounting the electrical devices inside partitions.

Typically, the bracket device comprises: (i) a base capable of being fixedly attached to a floor; (ii) a riser extending upwardly from the base; and (iii) an annular plate having front and rear faces attached to the upper portion of the riser and having an opening therethrough sufficiently large to receive an electrical device, the annular plate also having means such as mounting holes for attaching a cover ring to its front face and a junction box to its rear face. The annular plate is between the junction box and the front wall when the device is installed. The riser can be tapered from its lower portion to its upper portion to reduce materials cost and, alternatively, can be of substantially equal thickness along its entire length. Preferably the device also includes (iv) a stabilizing arm extending rearwardly from the annular plate, the arm being sufficiently long to extend to the rear wall of the partition. The riser, the stabilizing arm, or both, can be adjustable in length. The stabilizing arm can include a back plate extending vertically for additional stability of the bracket device. The stabilizing arm can extend from an upper segment of the annular plate. Alternatively, the stabilizing arm can extend from a lower segment of the annular plate for facilitating access to the annular plate from above when the electrical device is installed.

The base can be sized for attachment to a floor track, as is often used in non-residential construction.

An alternative embodiment of the invention incorporates a protective cover ring integral with the front face of the annular plate to form an integral mounting assembly.

Still another alternative embodiment of the invention incorporates an electrical junction box, the box being directly attached to the riser, and extending rearwardly from a rear face of the riser. Preferably the junction box is also attached to the rear stabilizing arm. In this version of the invention, there is no annular plate and the fastening means are provided on the junction box itself for fastening the protective cover ring to the box.

An additional embodiment of the invention has an annular ring portion comprising means for attaching three cover rings to the device.

A bracket device according to the present invention permits easy and rapid mounting of electrical junction boxes. The bracket device offers several advantages over traditional stud mounting. A bracket device according to the present invention can be used to mount a junction box at any time after the floor track is put down; there is no need to wait for the wall studs to be installed, and mounting can be performed when it is the easiest and most rapid. The bracket can be used to mount the junction boxes anywhere in the hollow partition; they need not be mounted only onto studs, as the traditional method requires. This simplifies and speeds planning and installation of complex or specialized electrical setups, as might be required in a factory or data-processing installation. The junction box can also be of any standard size and depth because it extends into the wall cavity and not into the wall partition thereby accommodating many sizes and types of electrical devices. The height of the boxes can be more readily adjusted than with conventional stud mounting, which is very useful in installing special electrical fixtures for the handicapped or other specialized applications. The junction box also has low susceptibility to damage during earthquake or fire because it is mounted to the bracket device which uses the floor for support. Also, the junction box extends into the wall cavity away from the wall partition which may buckle during earthquake or fire.

The means for attaching the cover ring to the front face of the annular plate allows the device to meet modern building codes. Cover rings are presently standardized by local building codes so that standard pieces, such as plastic wall outlet covers or light switch covers, can be attached to the cover ring.

The use of the electrical junction box mounting bracket device promises to not only speed the progress of construction, but also to cut its cost. The bracket device can be used anywhere a floor is laid down prior to finishing construction; it is equally adaptable to residential and commercial construction, and to all types of partitions.

DRAWINGS

These and other features, aspects, and advantages of the present invention will become better understood with reference to the following description, appended claims, and accompanying drawings, where:

FIG. 1A is an exploded perspective view of a bracket device embodying features of the present invention;

FIG. 1B is a vertical cross-sectional view of the device of FIG. 1A installed within a hollow partition;

FIG. 2 is a perspective view of another version of a bracket device according to the present invention in which the riser and stabilizing arm are adjustable;

FIG. 3 is a perspective view of another version of the bracket device in which the double cover ring is integral with the annular plate forming an integral mounting assembly; and FIG. 4 is a perspective view of another version of the bracket device in which there is no annular plate or cover ring and the junction box is fastened directly to the riser and stabilizing arm.

FIG. 5A is a perspective view of an additional version of the bracket device assembled with a cover ring in which the riser is not tapered and the stabilizing arm extends from the lower segment of the annular plate;

FIG. 5B is a vertical cross-sectional view of the device of FIG. 5A installed within a hollow partition;

FIG. 5C is a top view of the device of FIG. 5A;

FIG. 6 is a perspective view of yet another version of the bracket device in which a single cover ring is integral with the annular plate;

FIG. 7 is a perspective view of a version of the bracket device having a riser as in FIG. 5A and three integral double cover rings; and FIG. 8 is a perspective view of a version of the bracket device having an annular plate adapted to receive three double cover rings.

DETAILED DESCRIPTION

A bracket device according to this invention is designed to be inserted into the hollow space within a hollow partition. This partition has a front wall and a rear wall, with a hollow space therebetween. Examples of such partitions include exterior walls of buildings and interior walls within buildings separating one room from another. In this description, the exterior surface of the front wall faces the interior of the building or room, and the electrical device which is installed by means of the bracket device of the present invention is to be accessible from the exterior surface of the front wall. Examples of such electrical devices include switches such as light switches, wall sockets, and telephone jacks. The hollow partition typically seats against a floor, to which a floor track can be secured.

With reference to FIGS. 1A and 1B, a first version of a bracket device 10 embodying features of the present invention has a base 12. The base 12 is fixedly attached to a floor 14 so that the bracket device 10 is firmly attached to the floor 14. The base 12 is sized to fit a floor track 16, and the base 12 is secured to the floor track 16 by means of fasteners 18 inserted through fastener holes 20 in the base 12. The device of the present invention can also be secured beneath the floor track 16 before the floor track 16 is installed on the floor 14. The fasteners 18 can be nails, screws, or other conventional fasteners.

Attached perpendicularly to the base 12 and extending upwardly from it is a riser 22. The riser 22 can narrow in width along its vertical length.

Attached to the upper portion of the riser 22 is an annular plate 24 having a front face 26 and a rear face 28 and having an opening 30 therethrough sufficiently large to receive an electrical device (not shown) designed to be inserted into the hollow partition and accessible from the front or room side of the front wall of the partition. The front face 26 is shaped for attachment to a protective cover ring 32 or "mud ring." The rear face 28 is shaped for attachment to an electrical junction box 34 to which a particular electrical device (not shown) inserted through the opening 30 is wired. The annular plate 24 has mounting holes 36 for attachment of the cover ring 32 and the junction box 34. The cover ring 32 and junction box 34 are attached to the annular plate 24 by fastening means, such as screws 38, extending through the mounting holes 36.

In some applications, such as phone jacks, the junction box 34 is not necessary to install the electrical device and so only a means for attaching a cover ring to the front face 26 of the plate 24 is necessary. The reason for this is that some electrical devices, such as phone jacks, operate at very low voltages and therefore modern building codes do not require junction boxes.

The cover ring 32 is usually used for mounting plastic pieces, such as light switch covers, and can be of various sizes, depending upon the width of the electrical device to be installed. If, for example, a two-switch panel is to be installed, the cover ring 32 can extend nearly the width of the annular plate 24. Alternatively, if a single switch is to be installed, the cover ring 32 can extend roughly half the width of the annular plate 24 and be centered laterally within it. The position of the mounting holes 36 within the annular plate 24 is varied according to the size of the cover ring 32 used.

Attached to the upper portion of the annular plate 24 is a stabilizing arm 40. In this particular embodiment the stabilizing arm 40 is made up of three portions: a short vertical tab 42 connected directly to an upper segment 43 of the annular plate 24, a longer horizontal element 44 extending rearwardly from the top of the tab 42, and a back plate 46 extending further vertically from the back of the horizontal element 44. The back plate 46 may be omitted.

FIG. 1B shows the bracket device 10 of FIG. 1A installed inside a hollow partition 48, with the base 12 fixedly secured to the floor 14, the riser 22 extending vertically adjacent to the front wall 50, the annular plate 24 with the cover ring 32 and the junction box 34 attached thereto, and the stabilizing arm 40, including the back plate 46, extending rearwardly against the rear wall 52.

In a less preferred version of the invention, the stabilizing arm 40 can be omitted provided that the riser 22 is of sufficient stiffness to stabilize the annular plate 24 against rearward motion.

FIG. 2 shows an embodiment of the bracket device 60 in which both the riser 62 and the stabilizing arm 64 are adjustable in length. In this embodiment, the riser 62 consists of a lower portion 66 fixedly attached to the base 68 and an upper portion 70 fixedly attached to the annular plate 72. The lower portion 66 contains a slot 74 through which bolts 76 attached to the upper portion 70 protrude when the bracket device 60 is assembled. The bolts 76 are secured by wing nuts 78 which can be loosened to adjust the height of the riser 62 and tightened to lock the riser 62 in place.

In this embodiment, the horizontal element 80 of the stabilizing arm 64 is similarly adjustable, comprising a front portion 82 attached to the short vertical tab 84 and a rear portion 86 attached to the back plate 88. A slot 90 in the front portion 82 is used to secure the rear portion 86 by means of bolts 92 attached to the rear portion 86 and wing nuts 94.

It is not required for the operation of the bracket device 60 that both the riser 62 and the stabilizing arm 64 be adjustable; either or both of them can be adjustable.

FIG. 3 shows an additional embodiment of the device in which the cover ring 102 is part of the device 100, forming an integral mounting assembly 104. In this embodiment, the cover ring 102 is part of the front face 106 of the mounting assembly 104, and is provided with fastening means, such as a plurality of screw holes 108, for the fastening of the integral mounting assembly 104 to the electrical device (not shown). This version of the bracket device also has a vertical stiffener break 109 to provide structural support for the riser 107. The break 109 is an indented portion of the riser 107 and is required to meet some local building codes. The vertical stiffener break 109 can be included in any of the embodiments of the present invention disclosed in the drawings, and especially those embodiments with a tapered riser.

The cover ring portion 102 of the integral mounting assembly 104, like the cover ring 32 of the bracket device 10 shown in FIGS. 1A and 1B, can be of various sizes. If, for example, a two-switch panel is to be installed, the cover ring portion 102 of the integral assembly 104 can extend nearly the width of the assembly 104, as shown in FIG. 3. Alternatively, if a single switch is to be installed, the cover ring portion 102 of the integral assembly 104 can extend roughly half the width of the integral assembly 104 and be centered laterally within it.

An alternate embodiment of the bracket device is shown in FIG. 4. In this embodiment, the junction box 120 is fastened directly to the top portion of the riser 122 with the short vertical tab 124 of the stabilizing arm 126 being attached directly to the junction box 120, there being no annular plate. The open side 128 of the junction box 120 faces forward. In this embodiment, the front portion of the junction box 120 surrounding its opening 128 is provided with fastening means, such as a plurality of screw holes 130, for fastening the separate cover ring (not shown) to the junction box 120.

A bracket device according to the present invention is typically made of metal, generally 14, 16, or 18 gauge metal. A typical metal is galvanized iron, the bracket device being fabricated by stamping. The bracket device can also be made of a heavy duty durable plastic.

The dimensions of the bracket device according to the present invention can be varied according to the dimensions of the partition and electrical device with which it is intended to be used. Typically, the bracket device is approximately 4" wide. The height of the device is typically about 14½" to the top of the annular plate and about 12" to the center of the annular plate. The stabilizing arm has a length of approximately 1½" to 3½", depending on the width of the partition inside which it is to be installed. The back plate at the rear of the stabilizing arm is typically 1" in height.

In use, the bracket device according to the present invention is simply secured to the floor of the partition. The cover ring and the junction box are then mounted to the annular plate. If the bracket device includes either the cover ring or the junction box as part of the device itself, use of a separate part is not necessary. The stabilizing arm, if present, can optimally be secured to the interior surface of the back wall of the partition.

Turning to FIGS. 5A and 5B, an additional version of the device 105 is shown in which the stabilizing arm 126 extends from a lower segment 111 of the annular plate 110. This configuration of the device 105 allows better access from above the device 105 to install the junction box 126 on the annular plate 110 and to install electrical wiring. The stabilizing arm 126 has a horizontal element 112, a back plate 114 extending vertically from the element 112, and teeth 116 extending from the back plate 114. The back plate 114 rests against the back wall 118 primarily to secure the device 105 against horizontal movement. The teeth 116 secure the device 105 in appropriate alignment in the wall 118, which is usually made of dry wall material. The back plate 114 has a large enough area so it does not work through the back wall 118 during earth movement.

The device 105 also has a riser 122 which is not tapered. This is because the stabilizing arm 126 is cut from the riser 122. The riser 122 should therefore be wider near its upper end to provide adequate support for the annular plate 110.

The bracket device 105 has edge stiffener breaks 123 and 125 having bent corner angles. The breaks 123 and 125 extend along both the riser 120 and the base 127. These breaks 123 and 125 provide structural integrity for the device 105.

As with the bracket devices of FIGS. 1 through 4, the device 105 can be manufactured to any desired height. Also, the device 105 is installed in the partition in much the same manner as the devices of FIGS. 1 through 4, as illustrated in FIG. 5B.

If additional support is needed for the device 105, a self-tapping screw can be attached to the riser 120 through the front wall 128. FIGS. 5C illustrate the stabilizing arm 106 extending beyond the base 127 so the arm 126 reaches beyond the metal tracks 121 to the back wall 118. The electrical junction box 129 sits directly on the horizontal element 112 of the stabilizing arm 126, thereby providing additional support for the box 129.

FIG. 6 shows a bracket device 132 with a cover ring portion 134 which is integral with the annular plate 136. The cover ring portion 134 is for a single opening junction box in contrast with the double cover ring portion 102 illustrated in FIG. 3. The bracket devices of FIGS. 3 and 6 can each have either the double cover ring portion 102 or the single cover ring portion 134.

FIG. 7 illustrates another bracket device 138 comprising an annular ring portion 140 which can accommodate three double cover rings or a cover ring structure such as the structure 142 illustrated in FIG. 8. A bracket device can also have an annular ring portion for accommodating only two cover rings. In such a bracket device, the annular ring portion is centered over the riser of the bracket device. Finally, a bracket device can have an annular ring portion accommodating four or more cover rings.

FIG. 8 shows a bracket device 105 similar to the device illustrated in FIG. 5A and a cover ring structure 142 comprising three integral double cover ring attaching means 144. Therefore, the bracket device 105 can be used to mount more than one electrical device per bracket device by the use of the structure 142.

Bracket devices according to the present invention can be used in prefabricated electrical assemblies for the construction of buildings. For example, wall plug electrical outlets typically use vertical wall partition studs for structural support. However, the studs are frequently not in the proper position to meet building plan and/or code requirements for the positioning of wall outlets. Therefore, the studded partitions often must be altered or extended by skilled workmen at the building site to accommodate such requirements.

The bracket device of the present invention obviates the need for such expensive alterations or extensions of studded partitions and, in fact, allows the wall outlets to be prefabricated in the factory thereby further increasing efficiency and reducing labor and materials cost. An entire wall outlet or other electrical device, a cover ring, a bracket, and a junction box can be preassembled as a modular unit to a predetermined dimension in the factory. In fact, the bracket according to the present invention allows an entire electrical system, such as a lighting system and/or a power system, to be preassembled in a factory for later installation at a construction site. Previously, skilled laborers had to adapt the mounting structure for the electrical devices in electrical systems at a particular construction site. To install the prefabricated assembly requires only that the electrical construction worker place the assembly in the correct position along the floor track or stud inside the wall partition. The properly placed prefabricated assembly can be connected to the electrical conduit in the wall partition by a plug or other simple electrical connector. Therefore, expensive alterations or extensions of vertical wall studs are not required and the entire electrical assembly can be prefabricated in the factory.

Bracket devices according to the present invention can be used as templates for cutting dry wall by placing the devices against the front wall of the wall partition during installation of an electrical device. When wood studs are used in place of the floor tracks 16 and 121, the base 12 and 127 can be slid under the wood studs. The breaks 125 on either side of the base 127 may have to be eliminated or flattened to use the device 105 with wood studs.

Bracket devices according to the present invention are especially useful for installation in concrete wall formations. The bracket devices are connected in a very stable manner to the floor and therefore provide the additional support needed when concrete is poured over installed electrical junction boxes within concrete wall formations. The devices of the present invention are also especially useful when precise handicap-code heights are needed for installed electrical devices. The devices are automatically preset to the appropriate heights. On the other hand, conventional devices attached to wall studs have to be adjusted to the appropriate height at the building site.

In addition to being mounted upwardly from a floor track within wall partitions, bracket devices according to the present invention can also be mounted horizontally or downwardly. For example, horizontal mountings from wall studs may be advantageous to install light switches. Downward mountings of the bracket device can be used to install exit signs from doorways.

Although the present invention has been described in considerable detail with regard to certain preferred variations thereof, other versions are possible. Thus the spirit and scope of the appended claims should not be limited to the description of the preferred versions contained herein.

What is claimed is:

1. An installed bracket device for mounting a junction box in a structure comprising a floor, a floor track and a partition, the partition comprising a front wall and a rear wall with an interior space therebetween, the floor track being secured to the floor inside the interior space, the bracket device comprising:
   a) a base fixedly attached to the floor track so that the bracket device is fixedly secured to the floor without mounting the device to any stud of the partition;
   b) a riser extending upwardly from the base; and
   c) an annular plate having a front face and a rear face, the plate being attached to an upper portion of the riser and having an opening sufficiently large to receive an electrical device accessible from the exterior side of the front wall, the plate having means for attaching a cover ring to its front face and a junction box to its rear face, so that the plate is between the box and the front wall.

2. The bracket device of claim 1 further comprising a stabilizing arm extending rearwardly from the annular plate, the arm extending to the rear wall for stabilizing the bracket device against rearward movement.

3. The bracket device of claim 2 wherein the stabilizing arm extends rearwardly from an upper segment of the annular plate.

4. The bracket device of claim 2 further comprising a back plate attached to a rear portion of the stabilizing arm and transverse to the arm for providing a contact surface with the rear wall.

5. The bracket device of claim 2 including means for adjusting the length of the stabilizing arm.

6. The bracket device of claim 2 wherein the stabilizing arm extends rearwardly from an upper segment of the annular plate.

7. The bracket device of claim 1 including means for adjusting the height of the riser.

8. The bracket device of claim 7 further comprising a stabilizing arm extending rearwardly from the annular plate to the rear wall for stabilizing the annular plate against rearward movement, and wherein the device includes means for adjusting the length of the stabilizing arm.

9. The bracket device of claim 1 wherein the cover ring is integral with the front face of the annular plate, the cover ring having an opening sufficiently large to receive an electrical device accessible from the exterior side of the front wall.

10. The bracket device of claim 9 wherein the integral cover ring is a double cover ring.

11. The bracket device of claim 1 further comprising the cover ring attached to the front face of the annular plate.

12. The bracket device of claim 1 further comprising the junction box attached to the rear face of the annular plate.

13. The bracket device of claim 12 further comprising the electrical device mounted inside the junction box, the electrical device being accessible from the exterior side of the front wall through the opening in the annular plate.

14. The bracket device of claim 1 further comprising a cover ring structure for attachment to the front face of the annular plate, the cover ring structure having means for receiving a plurality of cover rings.

15. The bracket device of claim 14 wherein the means for receiving comprises an odd number of cover ring attaching means, the cover ring structure being attached to the annular plate so that an equal number of the cover ring attaching means is on each side of the annular plate.

16. An installed bracket device for mounting an electrical junction box in a structure comprising a floor track and a hollow partition, the hollow partition having a front wall and a rear wall with a hollow interior space therebetween, the floor track being located inside the hollow interior space, the junction box being integral with the bracket device, the bracket device comprising:
(a) a base fixedly attached to the floor track so that the bracket device is fixedly secured to the floor track without requiring the device to be mounted to any stud of the partition;
(b) a riser extending upwardly from the base; and
(c) a junction box, the box being attached to an upper portion of the riser, the box extending rearwardly from a plane defined by a rear face of the riser, the junction box having means for attaching a cover ring to a front side of the junction box.

17. The bracket device of claim 16 further comprising a stabilizing arm extending rearwardly from the junction box, the arm being sufficiently long to extend to the rear wall for stabilizing the bracket device against rearward movement.

18. An installed bracket device for mounting an electrical junction box in a structure comprising a floor track and a hollow partition, the partition comprising a front wall and a rear wall with a hollow interior space therebetween, the floor track being located inside the hollow interior space, the bracket device comprising:
(a) a base fixedly attached to the floor track so that the bracket device is fixedly secured to the floor without mounting the device to any stud of the partition;
(b) a riser extending upwardly from the base;
(c) an annular plate having a front face and a rear face, the plate being attached to an upper portion of the riser and having an opening sufficiently large to receive an electrical device accessible from the exterior side of the front wall, the plate having means for attaching a cover ring to its front face and a junction box to its rear face so that the plate is between the box and the front wall; and
(d) a stabilizing arm extending rearwardly from a lower segment of the annular plate thereby providing free access to the plate from above the device, the arm being sufficiently long to extend to the rear wall for stabilizing the bracket device against rearward movement.

19. The bracket device of claim 18 wherein the cover ring is integral with the front face of the annular plate, the cover ring having an opening sufficiently large to receive an electrical device accessible from the exterior side of the front wall.

20. The bracket device of claim 19 wherein the integral cover ring is a single cover ring.

21. A bracket device as in any one of claims 1 or 19 further comprising the electrical device attached to the bracket device.

22. The bracket device of claim 18 further comprising a cover ring structure for attachment to the front face of the annular plate, the cover ring structure having means for receiving a plurality of cover rings.

23. The bracket device of claim 22 wherein the means for receiving comprises an odd number of cover ring attaching means, the cover ring structure being attached to the annular plate so that an equal number of the cover ring attaching means is on each side of the annular plate.

24. An installed electrical bracket assembly for supporting a junction box inside a walled partition, the bracket assembly being mounted to a floor track fixedly attached to a floor, the bracket assembly comprising:
(a) a base snugly fitted into the floor track and fixedly attached thereto without requiring the bracket assembly to be mounted to any stud of the partition;
(b) a riser extending upwardly from the base;
(c) an annular plate attached to an upper portion of the riser, the plate having:
(i) an opening therethrough sufficiently large to receive an electrical device;
(ii) a front face and a rear face; and
(iii) means for attaching a cover ring to the front face and the junction box to the rear face.

25. The installed bracket assembly of claim 24 wherein the stabilizing arm extends rearwardly from an upper segment of the annular plate.

26. The installed bracket assembly of claim 24 wherein the stabilizing arm extends rearwardly from a lower segment of the annular plate.

27. The installed bracket assembly of claim 24 further comprising the junction box attached to the rear face of the annular plate.

28. The installed bracket assembly of claim 27 further comprising the electrical device mounted inside the junction box and accessible through the opening in the annular plate.

29. The installed bracket assembly of claim 24 further comprising a cover ring structure attached to the front face of the annular plate.

30. The installed bracket assembly of claim 24 further comprising a stabilizing arm extending rearwardly from the annular plate, the stabilizing arm being sufficiently long to extend to a rear wall for stabilizing the bracket device against rearward movement.

31. A method for installing an electrical assembly in a building having a floor with a floor track fixedly attached thereto, the method comprising the steps of:
(a) selecting a bracket comprising a base, a riser extending upwardly from the base, and an annular plate attached to an upper portion of the riser, the plate having a front face and a rear face;
(b) attaching an electrical junction box to the rear face of the bracket;
(c) attaching a cover ring to the front face of the bracket;
(d) placing the bracket snugly into the floor track before walls or wall studs are constructed in the building; and
(e) fixedly attaching the bracket to the floor track with fasteners so that when the walls are constructed the bracket is supported without requiring attachment to the wall studs and the junction box extends into a wall cavity between the walls.

33. The method of claim 31 further comprising the step of placing an electrical device of the assembly inside the junction box through an opening in the bracket.

33. The method of claim 31 wherein the steps (d) and (e) of placing the bracket in and fixedly securing the bracket to the floor track occur before the steps (b) and (c) of attaching the junction box and the cover ring to the bracket.

* * * * *